United States Patent [19]

Boily et al.

[11] 3,995,516
[45] Dec. 7, 1976

[54] APPARATUS FOR SKIVING GROOVES IN FLAT METAL STRIP

[75] Inventors: Norman E. Boily, Pawtucket, R.I.; Richard N. Jowitt, Warren, N.J.

[73] Assignee: Engelhard Minerals & Chemicals Corporation, Murray Hill, N.J.

[22] Filed: Aug. 18, 1975

[21] Appl. No.: 605,394

[52] U.S. Cl. .......................................... 83/5; 83/8; 83/175
[51] Int. Cl.² ........................................ B23D 1/00
[58] Field of Search ............................ 83/5, 8, 175

[56] References Cited
UNITED STATES PATENTS

| 3,276,302 | 10/1966 | Iusolio | 83/8 |
| 3,280,676 | 10/1966 | Grzymislanwski | 83/8 |
| 3,651,842 | 3/1972 | McLean | 83/5 X |
| 3,685,756 | 8/1972 | Marx et al. | 83/175 X |
| 3,752,021 | 8/1973 | Klien et al. | 83/5 |
| 3,863,530 | 2/1975 | Weidman | 83/5 |

FOREIGN PATENTS OR APPLICATIONS

| 2,061,579 | 7/1972 | Germany | 83/5 |

Primary Examiner—Frank T. Yost

[57] ABSTRACT

Prior to the bonding of precious metal ribbon to flat base metal strips useful for the fabricating of electrical contacts, grooves are skived into the surface of the metal strip to receive the precious metal ribbon. The apparatus disclosed is capable of skiving grooves of a predetermined depth in a flat metal strip, thereby avoiding the wastage of precious metal ribbon which occurs when such grooves are cut too shallowly or too deeply. In a preferred embodiments, an indexing wheel follows the surface of the metal strip and cutters adjusted to maintain a fixed spaced relation to the indexing wheel skive grooves of predetermined constant depth.

In another embodiment, a method of installing precious metal ribbon within grooves skived into metal strips is disclosed which comprises controlling the depth of such grooves by use of the principles and apparatus of the invention.

1 Claim, 11 Drawing Figures

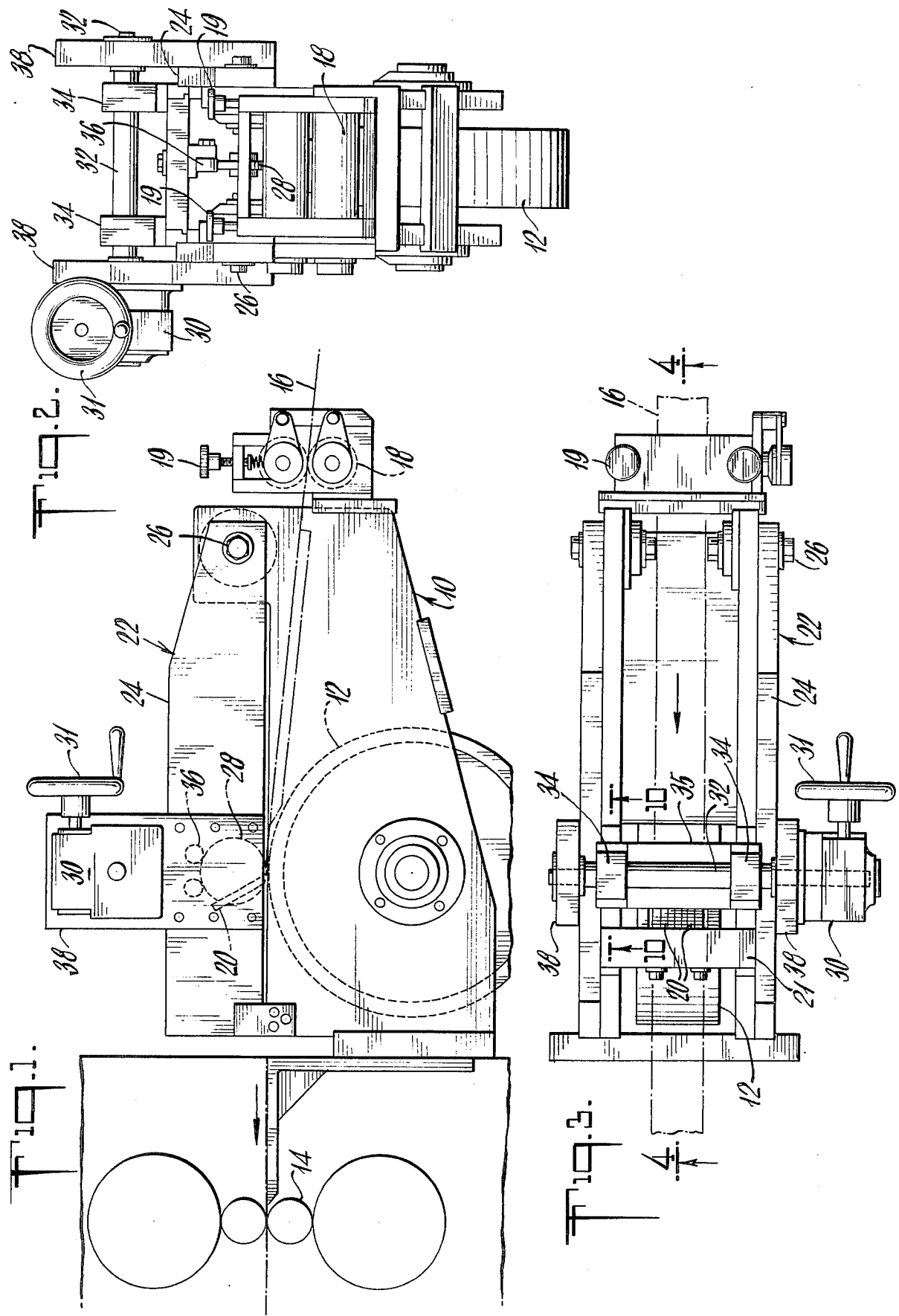

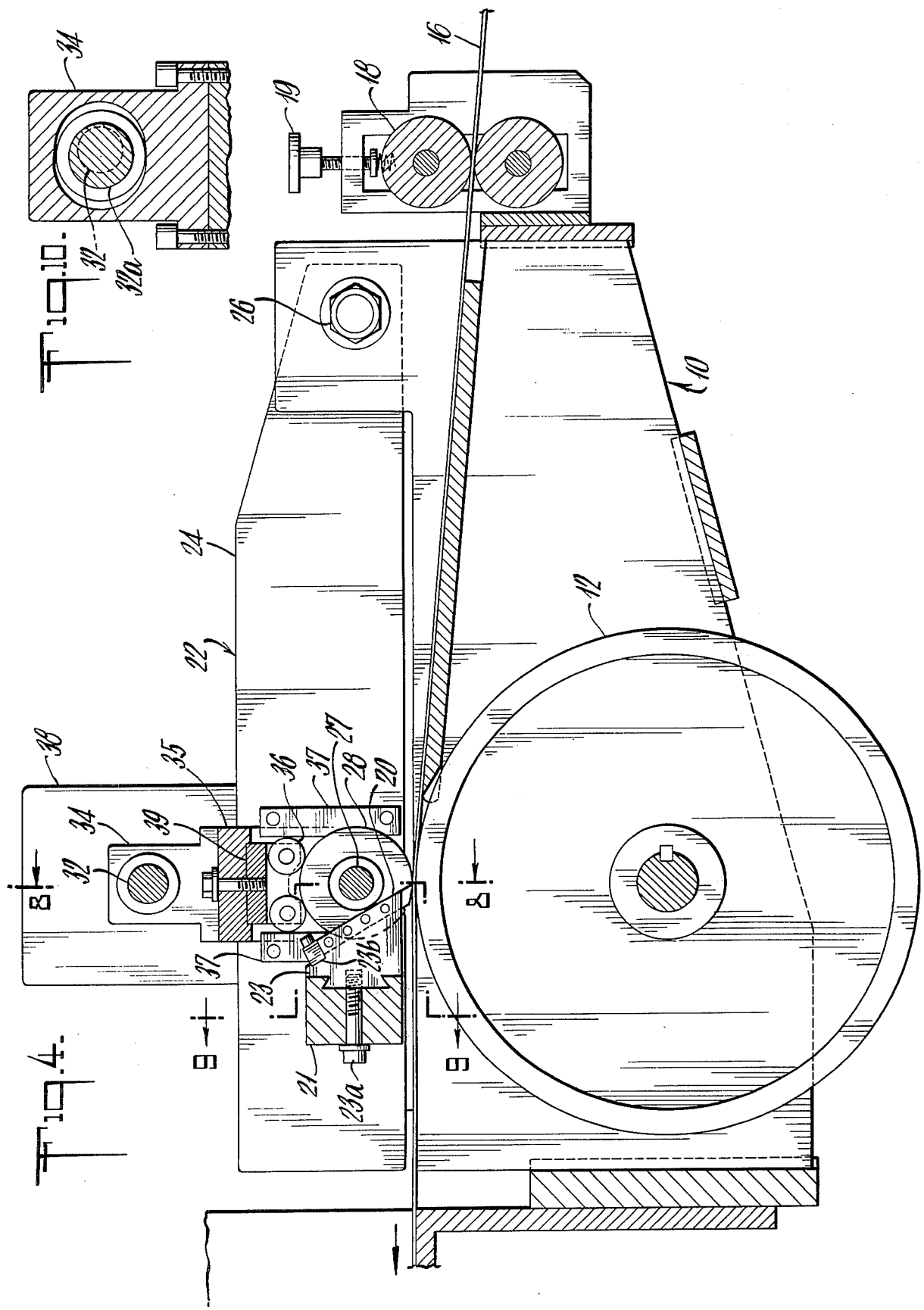

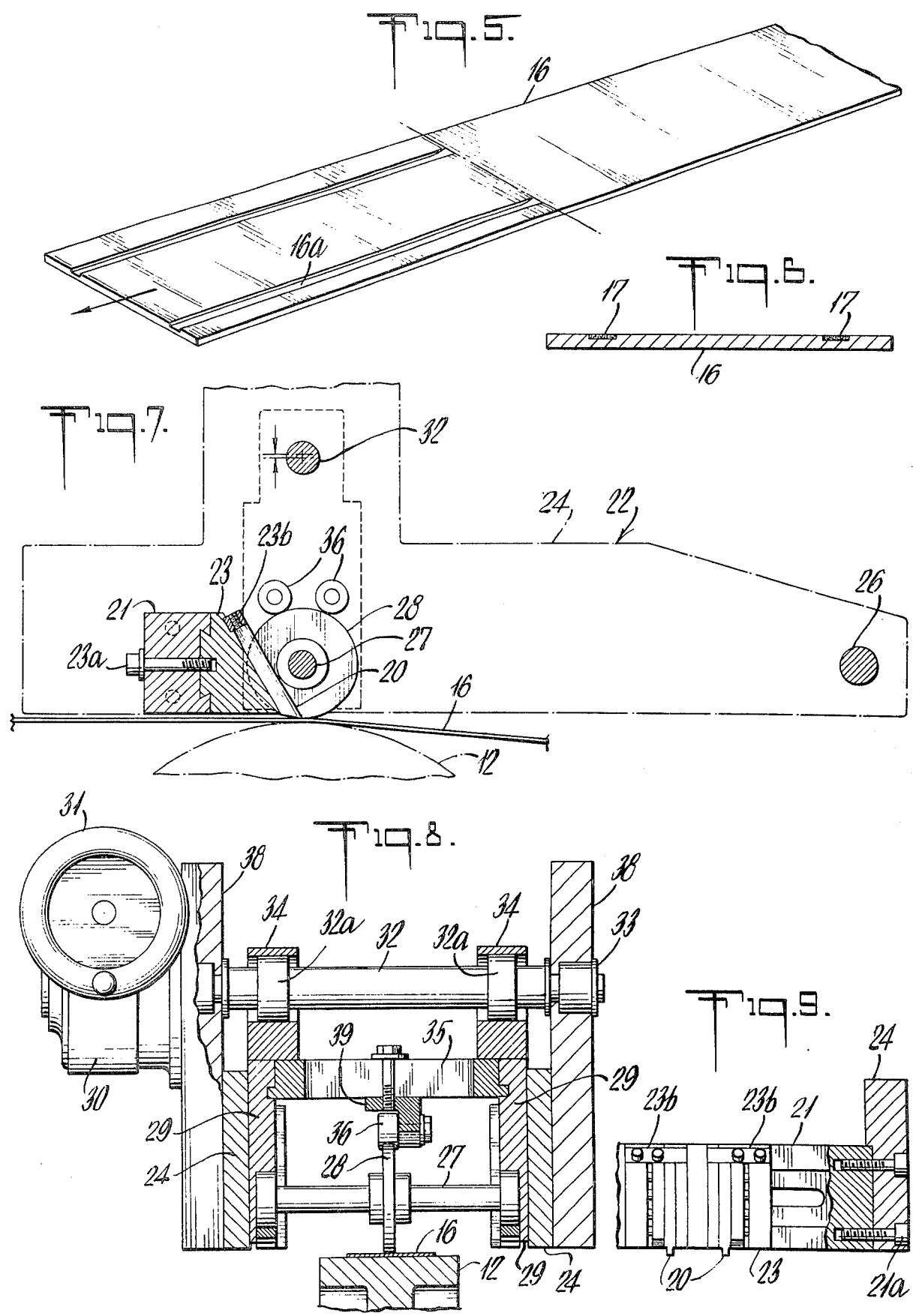

APPARATUS FOR SKIVING GROOVES IN FLAT METAL STRIP

BACKGROUND OF THE INVENTION

The invention in general relates to a method of skiving shallow grooves in metal. In particular, the invention relates to the continuous installation of metal ribbon, e,g., precious metals such as gold, palladium, and silver alloys into grooves cut in flat metal strip, which is thereafter rolled and fabricated for various end uses including the manufacture of precious metal electrical contacts and connectors. In a prior art method a flat metal strip, typicaly 0.14 inches thick and several inches wide, is fed into an apparatus which skives (cuts) grooves of about 0.025 inches in depth. A thin precious metal ribbon of a thickness equaling the depth of the groove is forced into the groove and bonded by high pressure rolling. Since the strip is thereafter rolled several times to reduce its thickness, it will be clear that the depth of a groove must be at least the thickness of the precious metal ribbon placed into it. If the ribbon protrudes above the surface of the strip before rolling, it is squeezed over the face of the strip during the rolling process, becoming excessive in width and insufficient in thickness and thus becoming waste which must be recovered and recycled at significant cost to the manufacturing process. The normal variation in thickness of such thin base metal strip is approximately ± 1 ½%. If the depth of the groove is too shallow by an amount equal to the maximum variation, about 15–16% of the precious metal is exposed after assembly and becomes waste. It will be readily appreciated that such a waste problem is expensive and highly undesirable since the precious metal is costly and must be recovered. If the groove is skived too deeply, no precious metal waste is created but the strip after rolling contains a larger proportion of the precious metal inlay than is necessary, which results in a more expensive product than if the groove had been skived to the correct depth.

In the present method of skiving grooves in the base metal strip, the cutters are adjusted to the average desired depth. Unfortunately, owing to the variations in thickness of the base metal stock the groove is often too deep or too shallow. The present invention overcomes this problem providing a method and apparatus of skiving one or more grooves in base metal strip stock which are of predetermined and constant depth, regardless of variation in the strip stock thickness.

Similar strip contacts are shown in U.S. Pat. No. 3,535,781 to Comey, Jr. and U.S. Pat. No. 3,468,015 to Santala, both of which are concerned with the problem of diffusion of the precious metal into the base metal stock and not with the skiving of grooves and the conservation of precious metal, which is the problem solved by the present invention.

U.S. Pat. No. 2,961,762 to Clark contains a description of a process similar to that to which the present invention is applied. In particular, Clark is concerned with the formation of arcuate precious metal ribbon in order to improve the bonding and does not concern himself with controlling the depth of the groove which receives the ribbon.

Reeve, in U.S. Pat. No. 2,226,944, discusses another aspect of the process with which the present apparatus of the invention is used. In order to obtain bonding without application of adhesives, it is necessary for exceptionally clean surfaces to be prepared. The surface of the base metal strip is cleaned by the skiving immediately prior to introduction of the precious metal ribbon into the groove. The precious metal ribbon is cleaned and kept free of contamination by heating in a hydrogen or inert atmosphere immediately prior to its application to the precious metal strip.

SUMMARY OF THE INVENTION

The difficulties of prior art apparatus in adjusting for the unavoidable variations of the thickness of the base metal strip are overcome in the present invention by providing a means for indexing the upper surface of the metal strip to be skived and positioning the cutters at a predetermined distance below the surface which is indexed. Thus, as the strip in passing through the apparatus becomes thinner, the indexing means moves with the strip surface and carries the cutter to a lower position, providing a groove of a constant depth. Alternatively, should the strip become thicker, the indexing means follows the surface to a higher position and carries the cutters with it, maintaining a constant depth for the groove. In the preferred embodiment, a fixed base comprising a support for the strip during the skiving process is pivotably attached to one end of a cantilever skiving means on which is mounted adjustable indexing means. Details of the apparatus will be more clearly seen by the description of the preferred embodiments and the drawings which follow.

In another embodiment of the invention a method is disclosed for installing precious metal ribbon to grooves skived in a base metal strip and in which wastage of the precious metal is avoided by maintaining a constant depth groove.

BRIEF DESCRIPTION OF THE DRAWINGS

FIG. 1 is a side elevation view of the apparatus of the invention.

FIG. 2 is an end elevation view of the apparatus of FIG. 1.

FIG. 3 is a plan view of the apparatus of FIGS. 1 and 2.

FIG. 4 is an enlarged sectional view taken substantially along line 4—4 of FIG. 3.

FIG. 5 illustrates the typical base metal strip, with and without grooves.

FIG. 6 is an end view of an assembled electrical contact strip.

FIG. 7 is an enlarged sectional view of the indexing and skiving means.

FIG. 8 is an enlarged sectional view taken substantially along line 8—8 of FIG. 4.

FIG. 9 is a partial sectional view taken along 9—9 of FIG. 4.

FIG. 10 is a sectional view taken along 10—10 of FIG. 3 of a Scotch yoke.

DESCRIPTION OF THE PREFERRED EMBODIMENTS

Figure 11:
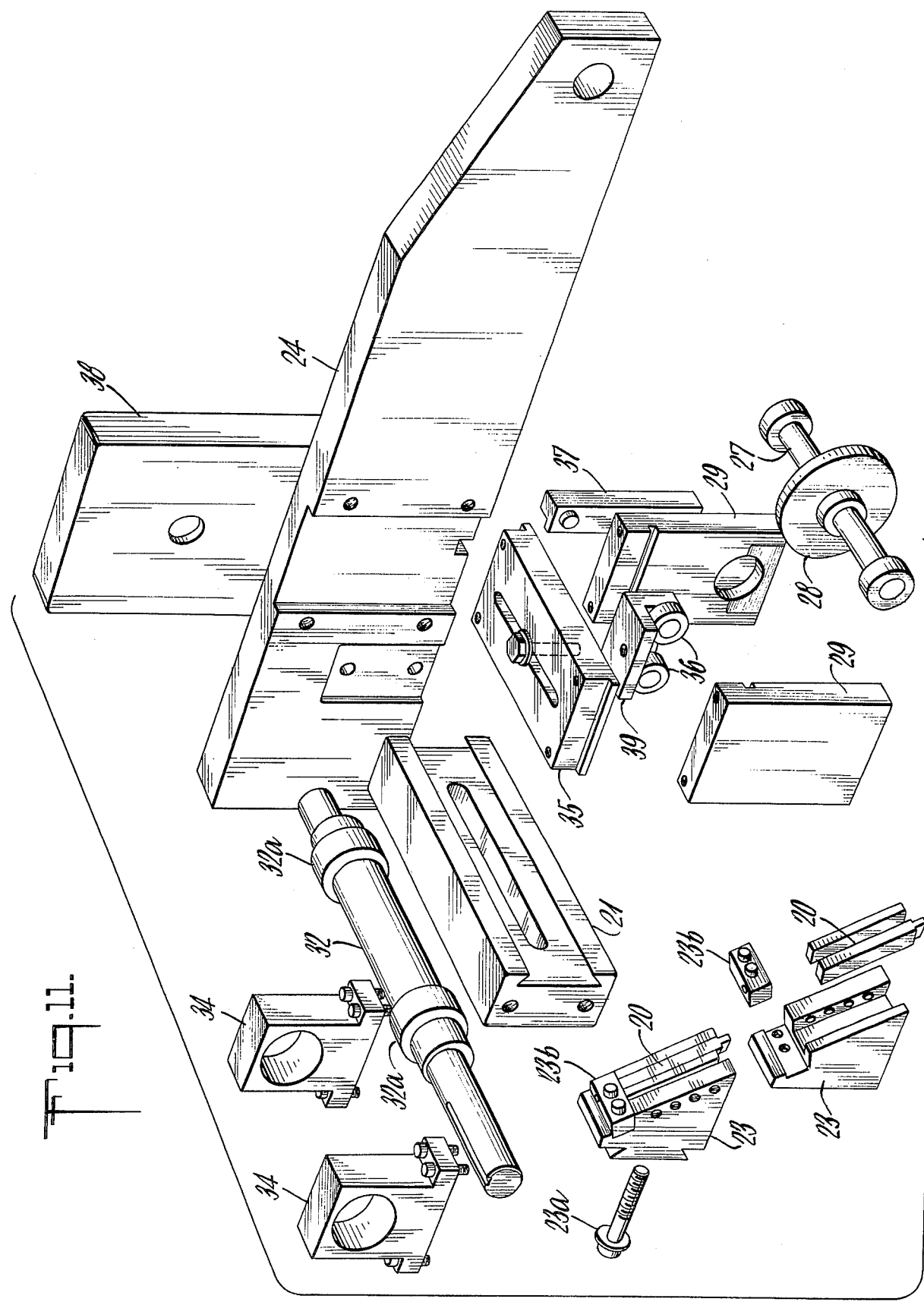
FIG. 11 is an exploded view of a preferred embodiment of the indexing and cutter means.

FIG. 1 shows a side elevation view of a preferred embodiment of the apparatus of the invention, including a portion of associated equipment used for assembling and rolling precious metal ribbon and base metal strip. Many portions of the apparatus can be identified generally which will be shown in more detail in the other figures. The fixed base frame designated 10 mounts an idler support wheel 12 on which the metal strip rests as it passes through the skiving machine and into strip advance rollers 14. In FIG. 1 a strip 16 enters at the extreme right through the drag rollers 18, passes over the support wheel 12, and then after the skiving of the grooves by the cutters 20, the strip passes to the strip advance rollers 14 which move the strip through the apparatus against the force of the cutters 20 and also press the precious metal ribbon (not shown) into the freshly cut base metal strip 16. Apparatus in which the base metal ribbon is heated in an inert atmosphere and passed down to engage the cut metal strip 16 is not shown, but it is generally located between the cutters 20 and the strip advance rollers 14.

The skiving means is generally referred to as being a cantilever 22 since it is assembled on a movable frame 24 and pivotably attached to the fixed base 10 adjacent the inlet end of the apparatus. Moving about pivot 26, the cantilever skiving means 22 rests on the fixed base 10 when a strip is not being skived. When strip stock is being skived, the weight of the cantilever skiving means 26 rests jointly on the cutters 20 which are skiving the strip and on the indexing wheel 28, which is mounted on the cantilever skiving means also. The details of this construction will be more clearly seen in subsequent figures and discussion. As the strip stock 16 enters the apparatus, it passes between drag rollers 18 which serve to maintain the flexible strip stock in a taut condition, which prevents it from being flexed during its passage through the apparatus and assures a smooth groove will be cut. Tension of these rollers 18 can be adjusted by means of the adjusting knobs 19 shown above them. In order to adjust the depth of cut, which typically may be only 0.025 inches but may vary with the type of strips or precious metal ribbon, the position of the indexing wheel 28 is adjusted through a mechanism to be described in detail later. A portion of that mechanism can be seen in FIG. 1, namely the high ratio gear box 30 and depth control operating wheel 31 attached thereto.

Having obtained a general understanding of the operation of the apparatus from FIG. 1, some of the details of the preferred embodiment can be seen from FIG. 2, which corresponds to a view from the right of FIG. 1. The fixed base frame 10 with the support idler wheel 12 and drag rollers 18 mounted thereon are seen in this end view. The high ratio gear box 30 and the depth control wheel 31 can now be seen in this view to operate an index adjustment shaft 32 which turns in bearings 33 mounted on the movable frame 24. In order to create the needed vertical adjustment of the index wheel 28, a Scotch yoke construction is used. The means by which this operates cannot be seen in FIG. 2, but will be easily understood from the subsequent figures. The vertical movement created by the Scotch yoke 34 is directed through the idler support beam 35, the idler wheels 36, to the indexing wheel 28.

FIG. 3 is a plan view of the apparatus of FIG. 1. It can be seen in FIG. 3 that the raw strip 16 enters from the righthand or inlet end of the apparatus and passes from right to left as urged by the strip advance rollers 14 which are only shown in FIG. 1. The skiving cutters are not shown in FIG. 3 but the strip 16 is shown to have been skived while passing under the idler support beam 35 which in this view conceals the indexing wheel 28 and the cutters 20.

FIG. 4 shows an enlarged view of some of the essential features of the preferred embodiment. The general outlines of the fixed base 10, the support idler wheel 12, the drag rollers 18, and the cantilever skiving means 22 can be seen. In this view the relationship of the cutters 20 and indexing wheel 28 can be seen.

It is appropriate at this point in the discussion of the preferred embodiment to consider that a groove of constant depth will be skived by cutters 20 in spite of variations in thickness of the base metal strip when the distance between the indexing wheel 28 and the cutters 20 is fixed. As the indexing wheel 28 rides on the upper face of the strip 16 being skived, it will follow the variations therein and the cutters 20, being in fixed relationship to the indexing wheel, will follow the indexing wheel 28 and maintain the desired groove depth in spite of fluctuation in base metal thickness. It should be appreciated that a typical base metal strip is about 0.14 inches thick and could vary ± 0.002 inches (± 1.5%). The precious metal ribbon which will be fitted into a precisely cut groove will only have a thickness of 0.025 inches ± 0.002. Obviously then, the normal variation of the base metal strip thickness is approximately 0.004 inches or about 16% of the thickness of the precious metal ribbon itself. Without the indexing wheel, a cutter in fixed position can do no more than cut an average groove depth and cannot accommodate the usual variations in strip thickness.

Swinging about its pivot 26, the weight of the entire skiving means structure 22 rests on the strip 16 as it passes over the support idler wheel 12. This weight is sufficient to cause the cutters 20 to penetrate the strip 16 if permitted by the indexing wheel 28. When the cutters 20 first meet the strip 16, they penetrate freely as all of the weight rests on the cutter's edge. Once it reaches the desired depth, the weight is transferred in part to the indexing wheel 28, which rests on the top of the strip 16 as it passes over the support idler wheel. The cutters 20 are adjustably mounted on a cutter support bracket 21. One or more grooves may be cut as desired. The position and spacing of the grooves can be adjusted by positioning the cutters 20 along the support bracket 21, as will be more clearly seen in later discussions. For a given strip they are ordinarily pre-set and not readjusted during operation. The indexing wheel 28 is mounted for vertical movement relative to the frame 24 of the cantilever skiving means 22 and therefore relative to the position of the cutter 20 also, which is secured in a fixed position on frame 24. By this means the distance between the index wheel 28 and the cutters 20 may be adjusted. The vertical movement of indexing wheel 28 is provided by means of the index adjusting shaft 32 acting through a Scotch yoke 34, which will be more clearly seen in FIG. 10. The index adjusting shaft 32 forces the Scotch yoke 34 in a vertical direction which, being attached to the idler support beam 35 and idler bracket 37 and the index support bracket 29 (not shown), adjusts the relative position of the cutter 20 and indexing wheel 28.

It is convenient at this point to examine FIG. 10 in which a sectional view of the index adjusting shaft 32 and its eccentric 32a are shown mounted within an elliptical opening to create a Scotch yoke generally designated 34. It can be seen that the movement of the eccentric 32a will create a vertical movement of the yoke 34. The maximum extent of that movement is determined by the dimensions of the eccentric. For this purpose only a very small movement is sufficient; typically ⅛ of an inch is ample for most practical commercial operations.

FIG. 5 illustrates a section of base metal strip 16. At the right the drawing shows the raw strip 16, which is relatively thin, approximately 0.010 to 0.180 inches for most commercial applications, but may be several inches wide. Two skived grooves 16a are shown in the left portion of the strip stock. These grooves when freshly cut are exceptionally clean and ready for application of the precious metal ribbon therein. As previously mentioned, a satisfactory bond of exceptionally clean metal surfaces can be made simply by rolling at high pressure without the use of adhesives.

FIG. 6 is a sectional view of the skived strip after the precious metal ribbon 17 has been applied and bonded. It will be noted that the ribbon 17 is shown flush with the surface of the base metal strip. This is one of the objectives of the invention and is achieved by skiving grooves 16a of constant depth despite variations in the thickness of the strip 16.

In FIG. 7 the raw strip 16 can be seen entering from the righthand portion of the drawing, passing over the support wheel 12 while being skived by the cutters 20, and leaving at the lefthand side of the drawing as a skived strip ready for the application of the precious metal ribbon. A pair of small idler wheels 36 engage the periphery of the indexing wheel 28 and assist in transferring the force exerted by the weight of the cantilever skiving mechanism 22 onto the indexing wheel 28. These idler wheels 36 are useful in order to obtain the most precise results. If the load rested solely on the idler wheel 28 through its shaft some deflection of the shift might occur which would increase the groove depth. By using the idler wheels 36 the load is distributed to the indexing wheel 28 primarily through the idler wheel 28 to prevent deflection of its shaft.

FIG. 8 shows an enlarged view of the idler wheel adjusting means used in the preferred embodiment. The strip 16 passes over the support wheel 12 and is engaged by the indexing wheel 28 which follows the surfaces of the strip and compensates for variations in thickness by adjusting the depth of the groove skived by the cutters. The indexing wheel 28 is carried on a shaft support at its end by the indexing wheel brackets 29. Between the index support bracket 29 extends the idler support beam 35 which adds strength to the structure and maintains the precision with which the grooves are cut. As previously mentioned, the weight of the skiving structure passes through the indexing wheel 28 both through its shaft 27 and through the intermediate idler wheels 36 which are mounted on the support beam 35. It should be appreciated that the movable frame 24 of the cantilever skiving means with its associated components moves vertically by only a few thousandths of an inch as a typical strip stock is skived and compensation is made for the variations in thickness thereof. The U-shaped index wheel support structure is attached by side brackets (see FIG. 11) to the movable frame 24 and at the top to the pair of Scotch yokes 34 through which the adjusting shaft 32 passes. The adjusting shaft 32 is secured in bearings 33 in the adjusting shaft supports 38. It is turned by rotating the depth control wheel 31, acting through the high ratio gear box 30. The maximum excursion of the index wheel 28 requires only a 180° rotation of the adjusting shaft 32. In order to provide adequate precision in making the adjustments, a gear ratio of forty to one is provided.

FIG. 9 shows a pair of cutters 20 mounted on their individual cutter supports 23 which are in turn secured within a cutter support bracket 21. The cutter supports 23 may be moved horizontally along the support bracket 21 to position the cutters 20 as desired. The cutter support bracket 21 is secured to the movable frame 24 by bolts 21a as shown.

The exploded view of FIG. 11 shows the indexing wheel and its adjustment means and the cutter assembly as they relate to the movable frame. Only one side of the movable frame 24 is shown. The adjusting shaft support 38 is securely attached to the side of the frame 24 and does not move. The cutter support bracket 21 is also firmly secured to each side of the frame 24 and does not move. The cutter support bracket 21 receives the cutter supports 23 which can be moved horizontally within the trapezoidal groove cut therein and locked in position by a securing bolt 23a from the rear. The cutters 20 are held in the cutter supports 23 by a clip 23b and secured by screws. The cutters 20 are locked in place on the frame 24. The indexing wheel mechanism provides for movement of the indexing wheel 28 relative to the frame 24 and thus the position of the cutters 20 relative to the indexing wheel 28 may be varied at will within limits provided by the Scotch yoke 34. Thus any predetermined groove depth may be maintained regardless of variations in the thickness of the metal strip. The indexing wheel 28 is mounted on a shaft 27 between two indexing support brackets 29. These brackets 29, since they must move vertically, are held in position by side brackets 37, two for each bracket 29, which allow vertical movement of the index support bracket 29 and the indexing wheel 28. To assure precision, as previously discussed, the idler support beam 35 bridges the two indexing support brackets 29 and provides a means whereby weight may be transferred directly to the indexing wheel 28 through the idler wheels 36 to the idler support beam 35 directly through the idler support bracket 39 rather than solely through the index wheel shaft 27, which would otherwise be required. In principle, these idler wheels 36 are not required in this embodiment of the invention, but for precision they are preferred. The support brackets 29 and support beam 35 form a U-shaped structure with the indexing wheel 28 mounted to the lower portion of the inverted U. At the top of the inverted-U are the Scotch yokes 34 through which the index adjusting shaft 32 is passed. This shaft is supported at its end by the shaft support 38 which is fastened to the movable frame 24. The eccentrics 32a mounted on the index adjusting shaft 32 interact with the elliptical opening of the Scotch yoke 34 to create a vertical movement of the yoke 34 which is transmitted to the indexing support wheel 28 through the support structure. A movement of 180° of the adjusting shaft 32 will create the maximum vertical movement of the indexing wheel relative to the movable frame 24. Since the cutters remain in fixed position relative to the frame 24, the relation between the indexing wheel 28 and cutters 20 can be adjusted to provide the predetermined groove depth as the metal strip passes through the apparatus.

In another aspect of the invention a method of installing flat precious metal ribbon within a groove in a flat base metal strip is achieved which comprises transporting an inert metal strip between an adjustable skiving means and a support means, where the skiving means includes an indexing means adapted to follow the contour of the surface of the strip so that a groove of constant predetermined depth can be skived therein. Once an accurately skived groove is skived into the surface of the strip, a precious metal ribbon having a thickness equal to the depth of the skived groove is cleaned and assembled into the groove by pressing the assembled strip and ribbon between rollers.

It will be clear to those skilled in the art that some variations may be made in the preferred embodiment without departing significantly from the spirit of the invention as described here and as set forth in the claims which follow.

What is claimed is:

1. An apparatus for forming grooves of predetermined depth in flat metal strip comprising:
   a. a fixed base frame having an inlet end and an outlet end and having a support member mounted thereon;
   b. a cantilever skiving means comprising,
      1. a movable frame pivotably attached at one end thereof to said base frame of
         a. and positioned above said base frame,
      2. an indexing wheel vertically adjustably mounted on said moveable frame of (b) (1) for contacting said flat metal strip while said strip is passed between said indexing wheel and the support member of (a), said indexing wheel being mounted for rotation in an index support bracket comprising a support beam mounting idler wheels for contacting said indexing wheel and directing force exerted on said indexing wheel to said support beam, said index support bracket being vertically slideably mounted to said moveable frame of (b) (1) and attached to an index adjusting shaft through a Scotch yoke, said index adjusting shaft being rotatably mounted on said moveable frame of (b) (1) for vertical movement of said index support bracket acting through said Scotch yoke, whereby the position of said indexing wheel relative to said moveable frame may be adjusted;
      3. cutting means horizontally adjustably mounted on said moveable frame of (b) (1) and positioned to skive a groove of depth in said metal strip determined by the relative positions on said moveable frame of (b) (1) of said cutting means and said indexing wheel of (b) (2);
   c. transporting means for feeding said strip over said support member against the force required to skive said groove.

* * * * *